United States Patent
Andreoli et al.

(10) Patent No.: US 6,827,203 B2
(45) Date of Patent: Dec. 7, 2004

(54) POSITIONING SYSTEM OF CONVEYOR GUIDES

(75) Inventors: Andrea Andreoli, Villanova (IT); Emanuele Bellini, Mirandola (IT)

(73) Assignee: Rexnord Marbett S.p.A., Correggio (IT)

( * ) Notice: Subject to any disclaimer, the term of this patent is extended or adjusted under 35 U.S.C. 154(b) by 0 days.

(21) Appl. No.: 10/286,461

(22) Filed: Nov. 1, 2002

(65) Prior Publication Data

US 2003/0094352 A1 May 22, 2003

(30) Foreign Application Priority Data

Nov. 2, 2001 (EP) ............................................. 01830681

(51) Int. Cl.⁷ .............................................. B65G 15/00
(52) U.S. Cl. ...................................... 198/836.3; 406/86
(58) Field of Search ............................ 198/836.3, 817, 198/465.4, 493; 406/86, 88

(56) References Cited

U.S. PATENT DOCUMENTS

| | | | |
|---|---|---|---|
| 3,527,336 A | | 9/1970 | Johnston |
| 5,542,789 A | * | 8/1996 | Aidlin et al. .................. 406/88 |
| 6,050,396 A | * | 4/2000 | Moore ...................... 198/836.3 |
| 6,244,429 B1 | | 6/2001 | Drewitz et al. |
| 6,305,528 B1 | * | 10/2001 | Leonard .................. 198/836.3 |
| 6,568,882 B2 | * | 5/2003 | Lanfranchi .................... 406/86 |
| 6,578,702 B2 | * | 6/2003 | Falkowski .................. 198/575 |
| 6,648,120 B2 | * | 11/2003 | Konieczny ............... 198/345.1 |

FOREIGN PATENT DOCUMENTS

| | | |
|---|---|---|
| DE | 146 741 C | 12/2003 |
| EP | 01 83 0681 | 3/2002 |

* cited by examiner

*Primary Examiner*—Richard Ridley
(74) *Attorney, Agent, or Firm*—Graybeal Jackson Haley LLP (57) ABSTRACT

A positioning system of guide elements of a conveyor of articles comprises: at least one guide positioning unit comprising a guide positioning element adapted to be operatively associated with a respective guide element for the positioning thereof; a system of traction-transmitting cables operatively associated with the guide positioning unit, for transmitting traction forces; at least one traction unit associated with the system of traction-transmitting cables for exerting traction forces on the system of traction-transmitting cables. The guide positioning unit is either a driven guide positioning unit (133), wherein the guide positioning element is caused to be moved by the traction forces transmitted by the system of traction-transmitting cables, or a driving guide positioning unit, comprising a motor group associated with the guide positioning element. The system of traction-transmitting cables comprises in the case of a driving unit, at least one traction-transmitting cable for transmitting traction forces between the traction unit and the driving unit; in the case of a driven unit, the system of traction-transmitting cables comprises at least one first traction-transmitting cable and at least one second traction-transmitting cable for transmitting respective first and second traction forces, respectively causing the guide positioning element to be moved in a first direction and in a second direction.

22 Claims, 9 Drawing Sheets

POSITIONING SYSTEM OF CONVEYOR GUIDES

PRIORITY CLAIM

The present application claims priority from European patent application no. 01830681.1, filed Nov. 2, 2001, presently pending.

FIELD OF THE INVENTION

The present invention relates in general to the field of conveyors of articles, for instance belt conveyors, chain conveyors and pneumatic conveyors. More specifically, the invention concerns a positioning system of guide elements of a conveyor, such as guide elements for containing, routing, sustaining the transported articles.

BACKGROUND OF THE INVENTION

In conveyors of articles, systems of guide elements are generally provided for containing and guaranteeing the correct routing of the transported articles in their movement along the transport path; guide elements may also be provided for sustaining the transported articles during their movement. Several typologies of guide elements exist, depending on the type of conveyor they are associated with.

A same conveyor can be employed for transporting articles of different nature, different spatial configuration, or also simply articles of similar nature but of different dimensions.

In order to adapt a conveyor to the transport of different types of articles, for example to assure the correct routing thereof, it may be necessary to adjust the position of the containment guide elements.

Let for example the case be considered of a pneumatic conveyor, of the type widely used for transporting plastic (typically PET) bottles from a production station to a following filling station of the bottles with the desired liquids, drinks or other.

Such a conveyor includes a chamber run through by a high-speed air flow. The chamber extends along a transport path of the bottles, for sections of typical length equal to thirty, forty or even fifty meters.

The chamber is open at the bottom and it is adapted to receive therein the terminal portion of the neck of the bottles. The high-speed air flow running through the chamber, striking the terminal portion of the neck of the bottles, imparts thereto a thrust in the desired direction, determining the movement thereof along the transport path.

In such a movement, the bottles are sustained by a pair of support guides, placed in correspondence of the bottom opening of the chamber and extending parallelly one in front of the other along the transport path. Such support guides act as supports for a support collar projecting from the terminal portion of the neck of every bottle. The bottles are thus transported by the flow of air while being hung to the support guides through the respective support collars.

In the movement along the transport path it is important that the bottles are maintained in a substantially vertical position. This allows avoiding that, because of rockings of the bottles, especially occurring in correspondence of curved sections of the transport path, the support collar stops on the support guides causing undesired stops of the bottle and, consequently, of the whole train of following bottles.

To assure that the bottles are maintained in a substantially vertical position, a pair of lateral containment guides is provided. The containment guides extend parallelly to each other along the transport path, at a lower height with respect to the two support guides. Typically, the two containment guides are placed at a height corresponding to the substantially cylindrical portion of maximum diameter of the bottles.

Generally, the two lateral containment guides are formed by bars of metallic or synthetic material, supported by clamps arranged in longitudinal periodic succession along the guides, for instance at regular intervals of about 50 cm. The clamps are provided with tangs that allow fixing the clamps to respective supports mounted on brackets that, being fixed to the chamber, extend downward therefrom.

To perform their function, the two containment guides must be kept in contact to, or at least they have to graze, the body of the bottles. Clearly, if the two guides are too close to each other, the friction they exert on the body of the bottles may unacceptably scrape the bottle body and even prevent the bottles from moving; on the contrary, if the two guides are too far apart, they cannot prevent the undesired rockings of the bottles.

Since the conveyor has to allow the transport of bottles of different diameter, for instance bottles of 1 lt, 1,5 lt and 2 lt, it must be possible to adjust the position of the two containment guides transversally to the transport path.

To such end, the coupling of the tangs of the clamps to the respective supports is manually adjustable by loosening screws or similar tightening means: acting on these screws loosening them, the tang of the clamp is released. Then, by making the tang of the clamp slide with respect to the respective support, the position of a section of the containment guide can be varied.

To adjust the position of the containment guides, the presence of one or more human operators is needed, which have to adjust the position of every support clamp of the guides. It is easy to realize that this operation is both complicated and extremely long, especially considering that in a transport line of approximately 50 m the number of guide support clamps is of the order of some hundreds. The time required to complete the adjustment operation, that is actually a dead time for the transport line, has a non-negligible impact on the overall manufacturing cost. In addition, the operation is prone to errors that, where not identified before the conveyor is started, can determine an irregular transport of articles, or even the stop of the whole transport line.

As far as the Applicant is aware, a pneumatic conveyor of plastic bottles is known in which the adjustment of the position of the containment guides, rather than being manual, is entrusted to pneumatic actuators. Each support clamp of the containment guides has associated thereto a respective actuator, enabling the movement of the support clamp transversally to the transport path.

It is clear that such a solution, if from one hand eliminates the necessity of a manual intervention for the adjustment of the positions of the guides, thereby reducing the dead times of the transport line, on the other hand impacts substantially on the overall cost of the conveyor and significantly increases the complexity thereof, since several hundreds of pneumatic cylinder-piston assemblies are required.

In addition to this, as in the case of the manual adjustment, it is not guaranteed that all the support clamps are moved of a same distance, with the consequence that the distance between the containment guides is not constant along the transport path. Even worse, it is not possible to assure a synchronous intervention of all the different cylinder-piston assemblies, so that some sections of the guides may move before others sections; the cylinder-piston assemblies may thus experience radial loads that may cause blocking of the pistons.

The cited example of pneumatic conveyor of plastic bottles exemplifies the problems that are generally posed by the operations of setting up a conveyor of articles so as to adapt it to the transport of articles of different nature, spatial conformation or dimensions.

SUMMARY OF THE INVENTION

In view of the state of the art outlined, it has been an object of the present invention to provide a positioning system of guide elements of a conveyor of articles that solved the aforementioned problems.

According to the present invention, a positioning system of guide elements of a conveyor of articles according to claim 1 is therefore provided.

Briefly stated, the guide positioning system comprises at least one guide positioning unit comprising a guide positioning element adapted to be operatively associated with a respective guide element for the positioning thereof.

A system of traction-transmitting cables is provided, operatively associated with the at least one guide positioning unit, for transmitting traction forces.

At least one traction unit is additionally associated with the system of traction-transmitting cables for exerting traction forces on the system of traction-transmitting cables.

The at least one guide positioning unit is one among a driven guide positioning unit, wherein the guide positioning element is caused to be moved by the traction forces transmitted by the system of traction-transmitting cables, and a driving guide positioning unit, comprising a motor group associated with the guide positioning element.

The system of traction-transmitting cables comprises, in the case of a driving unit, at least one traction-transmitting cable for transmitting traction forces between the traction unit and the at least one guide positioning unit, and, in the case of a driven unit, at least one first traction-transmitting cable and at least one second traction-transmitting cable for transmitting respective first and second traction forces, respectively causing the guide positioning element to be moved in a first direction and in a second direction.

Thanks to the positioning system according to the present invention, the operations of adjustment of the position of the guide elements of a conveyor are greatly simplified, being rendered substantially automatic. The dead times are therefore drastically reduced, with consequent increase of productivity. Additionally, the risks of committing errors in the adjustment operation are substantially eliminated.

BRIEF DESCRIPTION OF THE DRAWINGS

The features and advantages of the present invention will be made evident by the following detailed description of some possible embodiments thereof, description that is however provided purely by way of non-limitative example making reference to the attached drawings, in which.

DETAILED DESCRIPTION OF THE PREFERRED EMBODIMENTS

Figure 1:
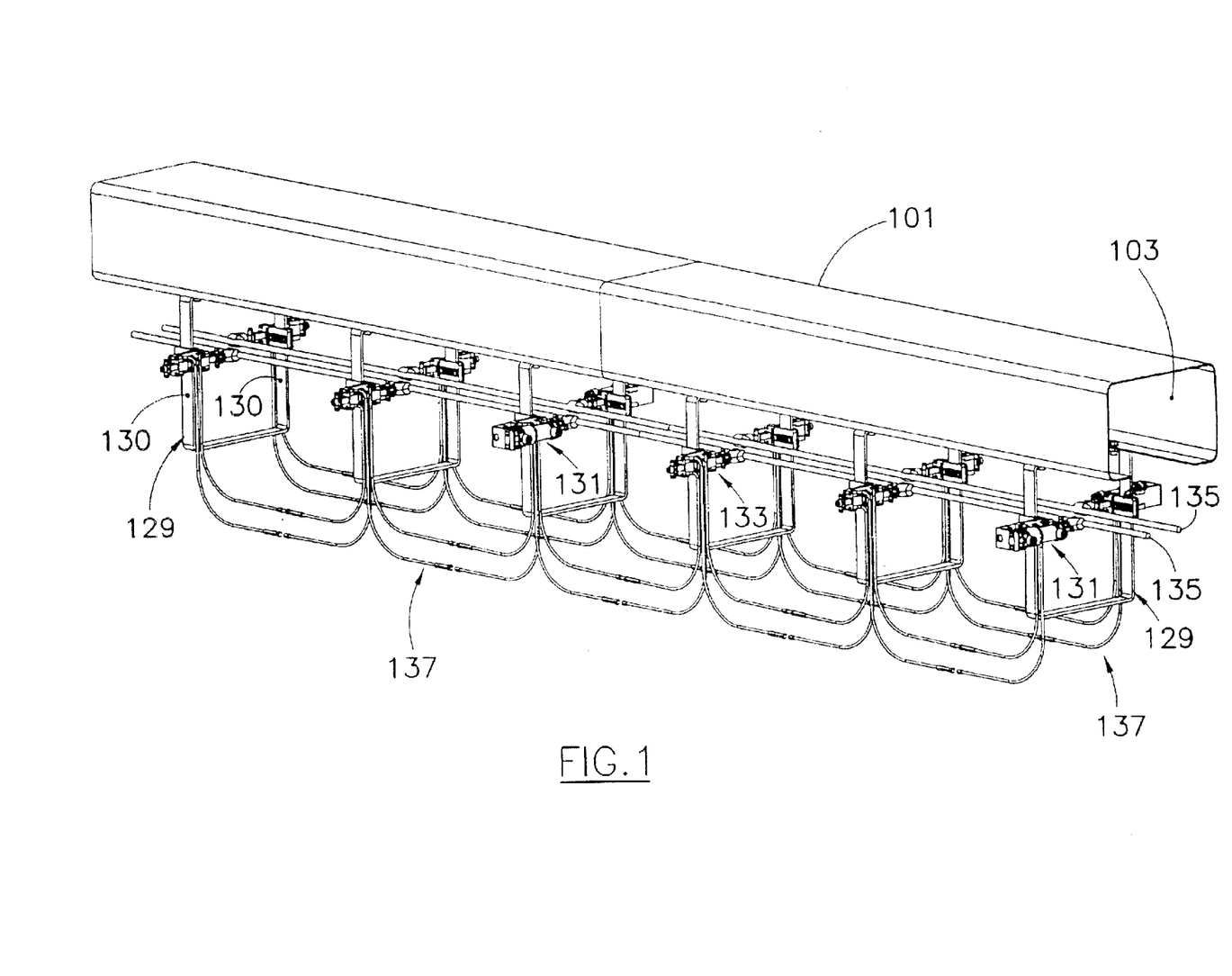
FIG. 1 is a view in axonometry of a section of a conveyor of articles, particularly a pneumatic conveyor for transporting plastic bottles, for greater clarity only partially assembled, equipped with a guide positioning system according to an embodiment of the present invention, particularly a positioning system of lateral containment guides for the transported bottles.

With reference to the drawings, in FIG. 1 there is shown in axonometric view a section of a pneumatic conveyor, particularly a pneumatic conveyor of the type used for transporting plastic bottles. The conveyor can for instance be part of a production line comprising a manufacturing station of the bottles, typically a station of blow moulding, and a filling station of the bottles with the prescribed liquids, drinks or other. The conveyor has therefore the function of transporting the bottles exiting from the manufacturing station to the filling station. For greater clarity, the pneumatic conveyor shown in FIG. 1 is partially assembled, lacking of some parts that are instead shown in FIG. 2. This latter is a view of the conveyor of FIG. 1 in section along a plane transversal thereto.

Figure 2:
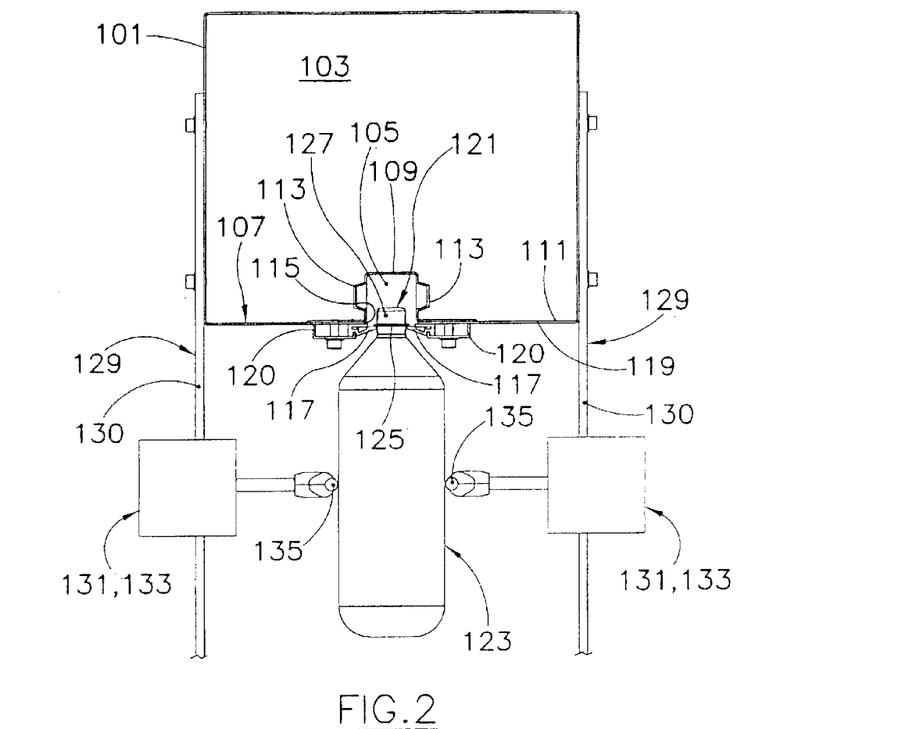
FIG. 2 is a view of the conveyor of FIG. 1 sectioned along a plane transversal thereto, completed with the parts missing in FIG. 1.

Referring jointly to FIGS. 1 and 2, the conveyor comprises a box-shaped casing 101, in the shown example having generically rectangular transversal cross-section, extending along a transport path of the bottles. The box-shaped casing 101 defines at the interior thereof a duct 103. The duct 103 is intended to be run through by a flow of air at high pressure, for instance produced by one or more electro-fans, not shown in the drawings, placed for example in correspondence of one end of the duct 103 upstream of the transport path, or distributed along the transport path.

As visible in FIG. 2, inside the box-shaped casing 101 a chamber 105 of substantially smaller dimensions is obtained. The chamber 105 extends, in correspondence of the bottom wall 107 of the box-shaped casing 101, for the whole transport path. The chamber 105 is delimited laterally and above by a profiled section 109 fixed to the inner side 111 of the bottom wall 107.

Along the profiled section 109 air collectors 113 are formed which allow the flow of air running through the duct 103 penetrating into the chamber 105. The chamber 105 results in this way run through by a flow of air at high speed.

In the bottom wall 107 of the box-shaped casing 101, substantially in central position thereof, an opening 115 is formed extending along the whole transport path. The profiled section 109 is attached to the bottom wall 107 of the box-shaped casing 101 in correspondence of such an opening 115, so that the chamber 105 results open at the bottom. To each one of the two major sides of the opening 115 there is associated a respective support guide 117, extending for the whole transport path. The support guides 117 are mounted on an outer side 119 of the bottom wall 107 by means of respective brackets 120.

The two support guides 117 define therebetween a gap of dimension adapted to the passage substantially without interference of necks 121 of transported bottles 123, at the same time providing a support for a support collar 125 projecting radially from the neck 121 of each bottle 123. The support collar 125 is conventionally formed in intermediate position along the neck 121 of the bottle, so that a terminal portion 127 of the neck extends into the chamber 105 and is stroke by the high-speed air flow running through the chamber 105.

The bottles 123 are in this way transported along the transport path suspended to the support guides 117 through the respective support collars 125, by the action of the high-speed air flow that runs through the chamber 105 and strikes the respective terminal portions 127 of the necks 121.

A plurality of brackets 129 is arranged in preferably periodic succession along the transport path. The brackets 129 are attached, at the two free ends thereof, to the box-shaped casing 101, and extend downward. Through respective vertical rods 130, each bracket 129 provides a support for a respective pair of active guide positioning units 131 or passive guide positioning units 133 of a positioning system according to an embodiment of the invention, for positioning of a pair of lateral containment guides 135. The containment guides 135 are for instance constituted by a pair of bars, in metal or in synthetic material or other suitable low-friction material, that extend parallelly to each other along the transport path at a lower height compared to the support guides 117, for instance at a height corresponding to that at which the substantially cylindrical portion of maximum diameter of the bottles 123 is located. The two guides 135 mainly have the function of keeping the bottles 123 substantially vertical in their movement along the transport path, preventing rockings especially in correspondence of curved sections of the transport path. The active units 131 and the passive units 133 placed on a same side of the conveyor with respect to a median longitudinal plane thereof are operatively connected to each other through a respective system 137 of traction-transmitting cables, adapted to transmit traction forces, for instance bowden cables, as will be better described in the following. In a possible embodiment, not at all limitative, each bracket supports two active units 131 or two passive units 133, which are placed one in front of the other. Alternatively, each bracket 129 can support an active unit 131 and a passive unit 133.

Figure 3A:
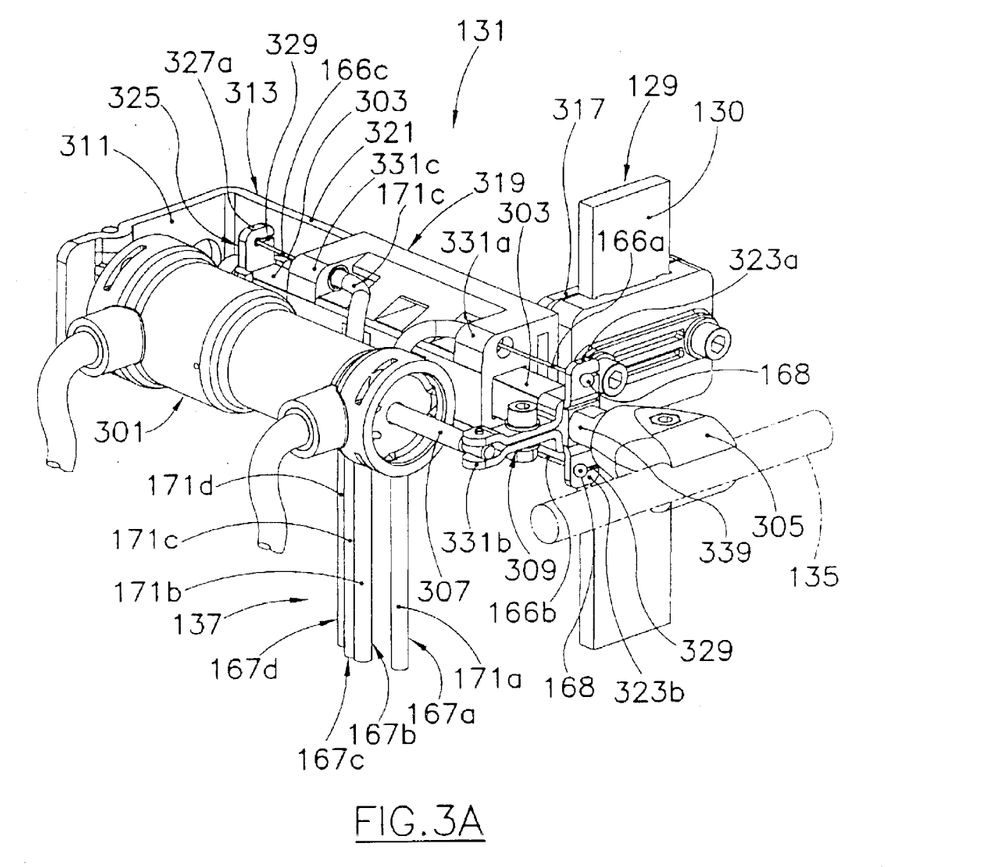
FIG. 3A is a front view in axonometry of a driving or active unit of the positioning system shown in FIG. 1.
Figure 3B:
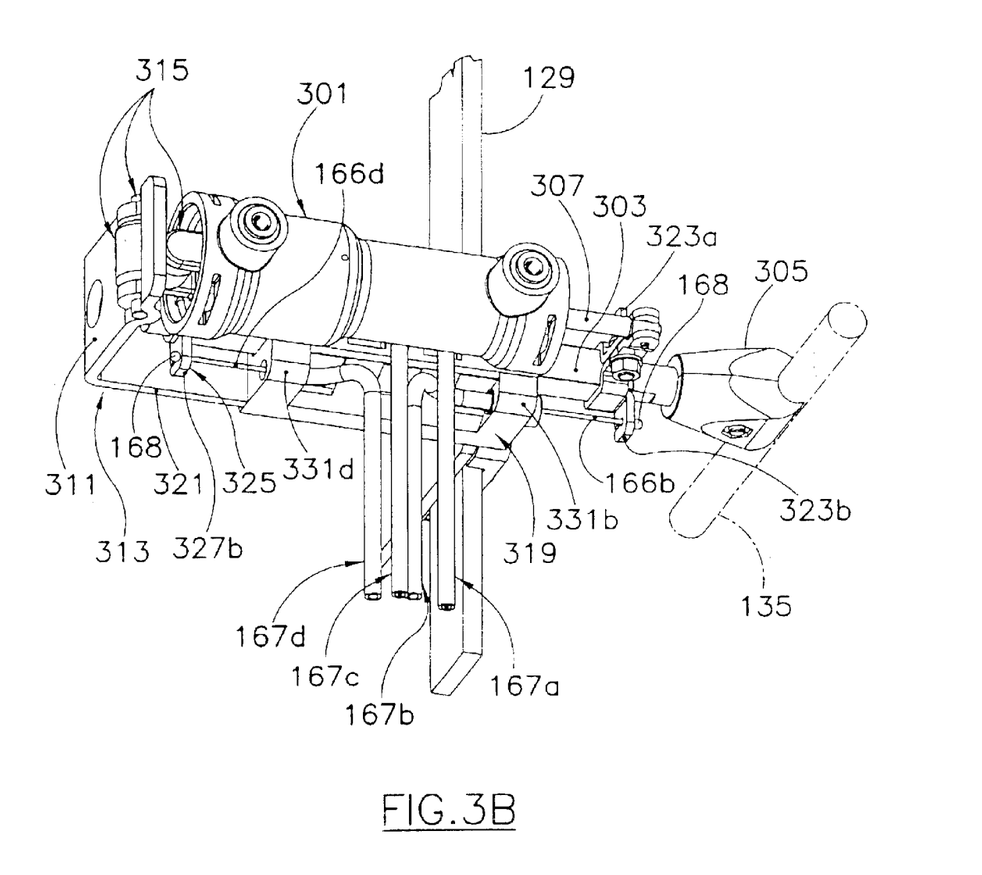
FIG. 3B is a bottom view in axonometry of the active unit shown in FIG. 3A.
Figure 3C:
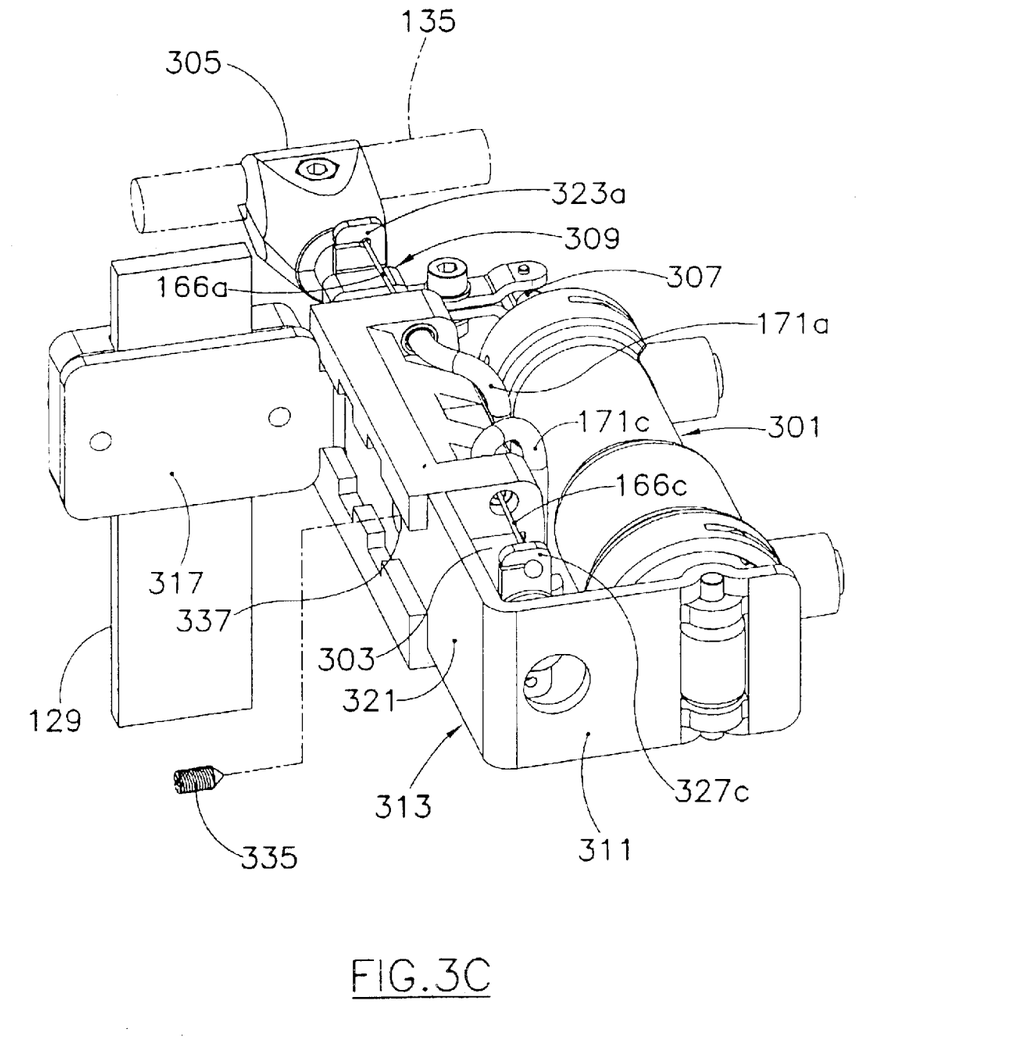
FIG. 3C is a rear view in axonometry of the active unit of FIGS. 3A and 3B.

FIGS. 3A, 3B and 3C show in detail the structure of a generic active unit 131. The active unit 131 includes a guide positioning element, for instance a sliding member, e.g. a shaft 303, and a motor group, for instance a cylinder-piston assembly 301, e.g. of the pneumatic type, that controls a translation movement of the sliding member. A clamp 305 is associated with an end of the shaft 303 and is adapted to grasp one of the pair of a containment guides 135. The shaft 303 is made to translate by a stem 307 of the cylinder-piston assembly 301, joined to the shaft 303 by a clamp 309 tightened around the shaft 303 substantially in correspondence of an end thereof proximate to the containment guide 135. Particularly, the shaft 303 and the stem 307 have respective axes lying in a same plane, in the shown example perpendicular to the vertical rod 130 of the respective bracket 129, and a free end of the stem 307 is hinged, with rotation axis perpendicular to the aforementioned plane, to a fork formed by the bifurcation of two end portions of the clamp 309. The cylinder-piston assembly 301 is coupled, at the side thereof opposite to the stem 307, to a first wing 311 of an "S"-shaped support bracket 313. Preferably, the coupling is obtained through an articulated joint 315, for instance a universal joint, adapted to allow the movement of the cylinder-piston assembly in two planes perpendicular to each other: a first plane is the plane in which the axes of the stem 307 and of the shaft 303 lie, while a second plane is a plane perpendicular to the former one. This introduces the necessary degrees of freedom so that the stem 307 is always exclusively subject to compressive stresses, and not to radial stresses. A second wing 317 of the bracket 313 is mounted to the vertical rod 130 of the respective bracket 129, through screws or similar attachment means, preferably such as to allow the adjustment of the attachment height along the vertical rod of the bracket 129. The shaft 303 is slidably supported by a guide body 319, in turn supported by the "S"-shaped bracket 313 to which the guide body is mounted slidably along a portion 321 intermediate to the two wings 311 and 317.

The clamp 309 includes a pair of wings 323a, 323b transversal to the shaft 303, particularly such as to extend, at opposite sides, perpendicularly to the plane in which both the axis of the shaft 303 and the axis of the stem 307 lie. In correspondence of one end of the shaft 303 distal from the containment guide 135, a plate-like element 325 is mounted on the shaft 303; the plate-like element 325 is provided with a pair of wings 327a and 327b also transversal to the shaft 303. In particular, similarly to the wings 323a, 323b of the clamp 309, the wings 327a, 327b of the plate-like element 325 extend perpendicularly and at opposite sides of the plane in which both the axis of the shaft 303 and the axis of the stem 307 lie.

In each of the wings 323a, 323b, 327a, 327b a notch 329 is provided for the insertion of an extremity portion of a respective cable core 166a, 166b, 166c, 166d of a respective bowden cable 167a, 167b, 167c, 167d, part of the system of bowden cables 137. The extremity portion of each cable core 166a, 166b, 166c, 166d ends with a respective enlarged portion 168, for instance a sphere formed over the cable core, of dimensions larger than the notch 329.

The guide body 319 comprises four shoulders 331a, 331b, 331c, 331d. A first pair of shoulders 331a and 331b is located on the side of the proximal end of the shaft 303, while a second pair of shoulders 331c and 331d is located on the side of the distal end of the shaft 303. Each shoulder 331a, 331b, 331c, 331d is provided with a through hole of dimensions adapted to allow the passage of a respective one of the cable cores 166a, 166b, 166c, 166d and of the associated extremity sphere 168, but not of a respective cable sheath 171a, 171b, 171c, 171d: an end of the cable sheath, provided with a suitably flanged terminal, e.g. in metal, abuts against the entrance of the through hole.

The bowden cables 167a and 167c extend from the active unit 131 to a unit, indifferently passive or active, that precedes the active unit 131 along the transport path. The bowden cables 167b and 167d extend from the active unit 131 to a unit, indifferently active or passive, that follows the active unit 131 along the transport path.

Preferably, but not limitatively, the shaft 303, and thus the coupling thereof to the guide body 319, is prismatic and not cylindrical. This allows avoiding that the weight of the cylinder-piston assembly 301 causes a rotation of the shaft 303 around the axis thereof with respect to the guide body 319, and therefore a misalignment of the stem 307.

Still preferably, the clamp 305 is provided with an externally-threaded tang 339, screwable within a threaded hole provided in the proximal end of the shaft 303. This allows the interchangeability of the clamps 305, making it possible to substitute a clamp of a given type with another type of clamp deemed more suitable in view of the particular application, without having to modify the structure of the active unit 131. For instance, it is possible to associate to an active unit clamps having tangs 339 of different length.

Figure 4A:
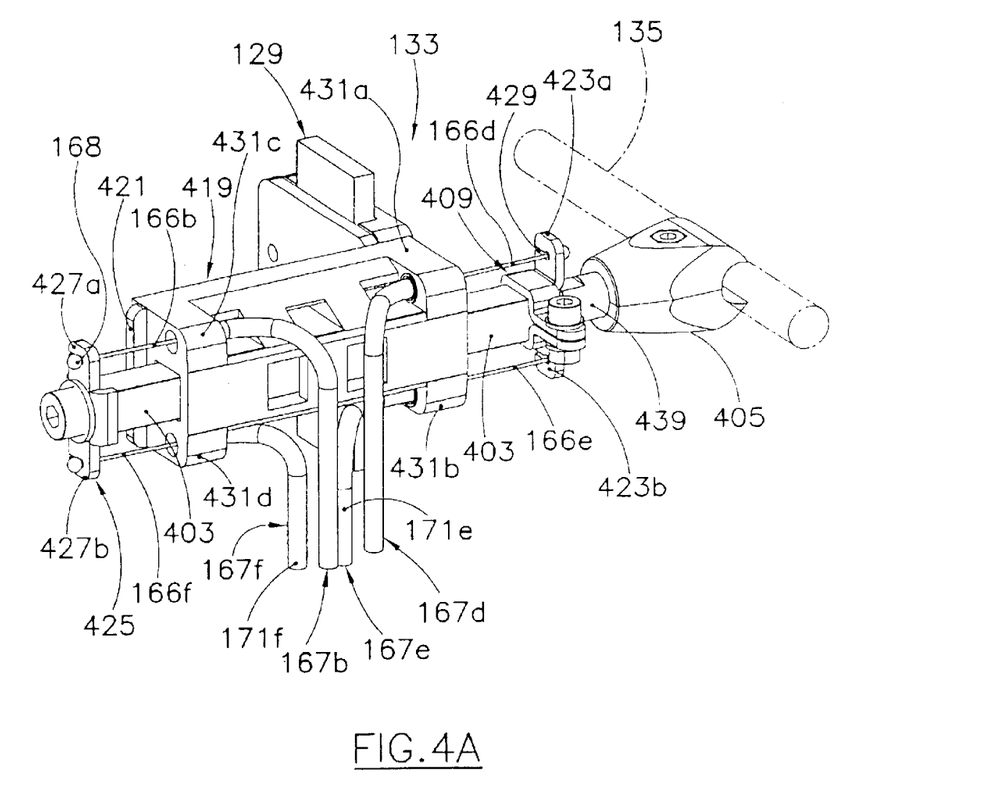
FIG. 4A is a lateral view in axonometry of a driven or passive unit of the positioning system of FIG. 1.
Figure 4B:
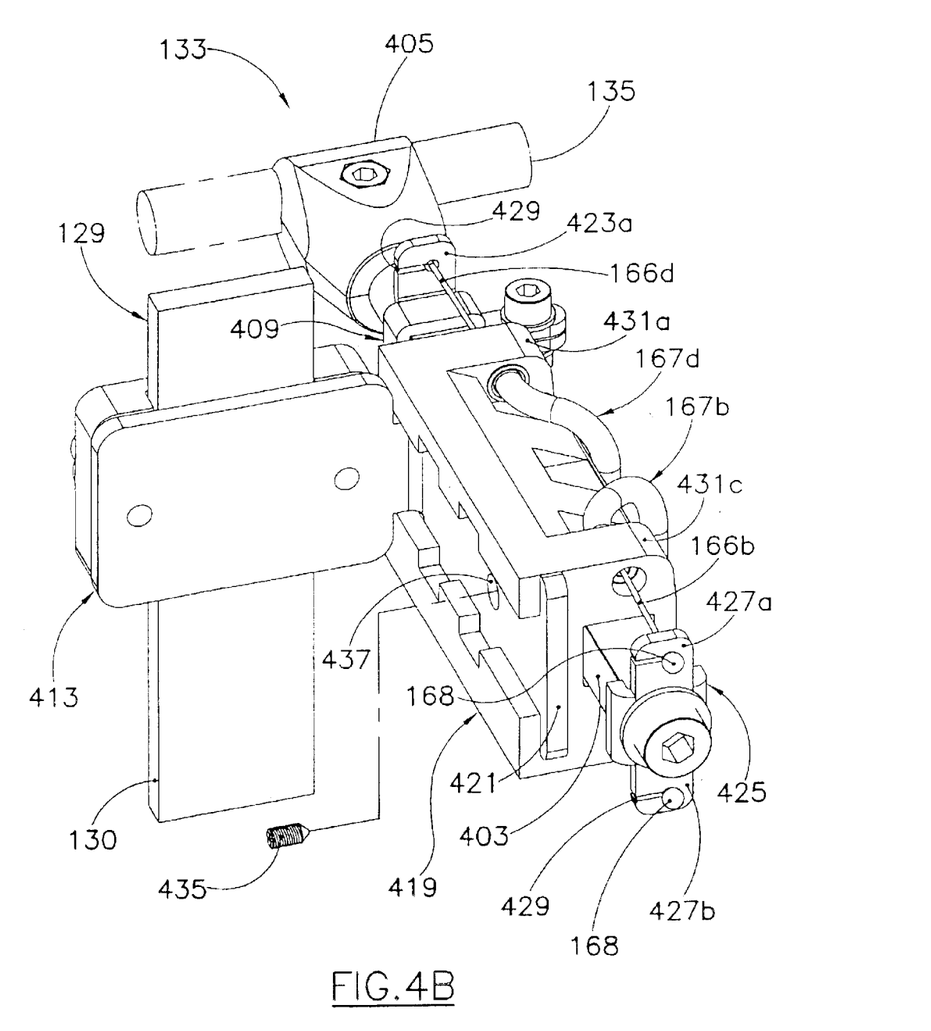
FIG. 4B is a rear view in axonometry of the passive unit of FIG. 4A.

FIGS. 4A and 4B show in detail the structure of a generic passive unit 133. Simpler than the active unit 131, the passive unit 133 includes a guide positioning element, for instance a sliding member, e.g. a shaft 403 to an end of which a clamp 405 is associated adapted to grasp the containment guide 135. A clamp 409 is tightened around the shaft 403 substantially in correspondence of one end thereof proximal to the containment guide 135. The shaft 403 is slidably supported by a guide body 419, in turn supported by an "L"-shaped support bracket 413, with a leg 421 to which the guide body 419 is slidably mounted and a base 417 mounted to the vertical rod of the respective bracket 129 by means of screws or similar attachment means; also in this case, the attachment of to the vertical rod is preferably such as to allow the adjustment of the attachment height along the vertical rod of the bracket 129.

The clamp 409, entirely similar to the clamp 309 of the active unit 131 except for the fact that the fork for hinging the stem 307 is not provided for, comprises a pair of wings 423a, 423b transversal to the shaft 403, particularly such as to extend perpendicularly and at opposite sides of a plane in which both the axis of the shaft 303 and the axis of the containment guide 135 lie. In correspondence of one end of the shaft 403 distal from the containment guide 135, a plate-like element 425 similar to the plate-like element 325 mounted on the shaft 303 of the active unit 131 is mounted on the shaft 403. The plate-like element 425 is provided with a pair of wings 427a and 427b also transversal to the shaft 403. In particular, the wings 427a, 427b of the plate-like element 425 extend in the same direction as the wings 423a, 423b of the clamp 409.

In each wing 423a, 423b, 427a, 427b a notch 429 is provided, for the insertion of an extremity portion of a respective cable core of a bowden cable of the system of cables 137. For instance, supposing that the passive unit 133 shown in FIGS. 4A and 4B is the unit that follows, along the transport path, the active unit 131 previously described, the notches 429 provided for in the wings 423a and 427a receive the terminal portions of the cable cores 166d and 166b, respectively, of the bowden cables 167d and 167b coming from the active unit 131. The notches 429 in the wings 423b and 427b receive instead the terminal portions of two further cable cores 166e and 166f of bowden cables 167e and 167f of the system of cables 137, that extend to a unit, indifferently passive or active, following the passive unit 133 along the transport path. The extremity portion of each cable core 166a, 166b, 166c, 166d ends with a respective sphere 168 formed there over, of larger dimensions than the notch 429.

The guide body 419 comprises four shoulders 431a, 431b, 431c, 431d. A first pair of shoulders 431a and 431b is located on the side of the proximal end of the shaft 403, while a second pair of shoulders 431c and 431d is located on the side of the distal end of the shaft 403. Each shoulder 431a, 431b, 431c, 431d is provided with a through hole of dimensions adapted to allow the passage of one of the cable cores 166b, 166e, 166d, 166f and of the associated extremity sphere 168 but not of a respective cable sheath 171b, 171e, 171d, 171f; an extremity of the cable sheath, provided with a metallic flanged terminal, abuts against the entrance of the through hole.

As in the case of the active unit 131 previously described, the clamp 405 is preferably provided with an externally-threaded tang 439, screwable within a threaded hole provided in the proximal end of the shaft 403.

Concerning the materials, the guide bodies 319, 419 are preferably realized in low-friction plastic material, for instance acetalic resin. The support brackets 313, 413 can be realized both in steel and in plastics. The shafts 303, 403 are preferably realized in steel.

Making again reference to FIG. 1, it is thus possible to note that in this embodiment of the invention each positioning unit of the containment guides 135, be it an active unit 131 or a passive unit 133, is connected, through a first pair of bowden cables, to the preceding positioning unit, indifferently active or passive, along the transport path and, through a second pair of bowden cables, to the following active or passive positioning unit along the transport path. In other words, a chain of interconnected guide positioning units is formed. The first guide positioning unit of the chain is connected only to the positioning unit, indifferently active or passive, following it along the transport path, while the last positioning unit of the chain is connected only to the preceding active or passive positioning unit.

In the active units 131, the bowden cables 171a and 171b, whose respective cable cores 166a and 166b are anchored to the clamp 309, allow transmitting the movement of advancement of the shaft 303, determined by the extension of the stem 307, to the adjacent active or passive units along the transport path: when the shaft 303 advances, the cable cores 166a and 166b are in fact submitted to traction. In the, e.g., passive unit 133 following the active unit 131 along the transport path, the traction of the cable core 166b determines the advancement of the shaft 403. The same happens in the active or passive unit that precedes the active unit 131 and that receives the movement through the traction of the cable core 166a. In the passive unit 133, the advancement of the shaft determines the traction of the cable core 166e: in this way the passive unit 133 transmits in turn the movement to the following active or passive unit. In other words, the movement of advancement of the shaft of an active unit 131, determined by the respective cylinder-piston assembly 301, determines, by dragging through the cable cores of the bowden cables, the movement of advancement of the shafts of the adjacent active or passive units. These in turn, through the bowden cables, transmit the movement of advancement of the respective shafts to the units adjacent thereto, and so on. The containment guide 135 thus approaches to the median plane of the conveyor.

In a totally similar way, when the stem 307 of the active unit 131 moves back, the shaft 303 moves back, and the cable cores 166c and 166d of the bowden cables 167c and 167d are put in traction. In the passive unit 133 following the active unit 131 along the transport path, the traction of the cable core 166d causes the shaft 403 to move back. The same happens in the active or passive unit that precedes the active unit 131 and that receives the movement through the traction of the cable core 166c. In the passive unit 133, the moving back of the shaft determines the traction of the cable core 166f: in this way the passive unit 133 transmits in turn the motion to the following active or passive unit. Also in this case, the movement of withdrawal of the shaft of an active unit 131 determined by the respective cylinder-piston assembly 301 determines, by dragging through the cable cores of the bowden cables, the movement of withdrawal of the shafts of the adjacent active or passive units. These in turn, through the bowden cables, transmit the movement of withdrawal of the respective shafts to the units adjacent thereto, and so on. The containment guide 135 thus moves away from the median plane of the conveyor.

Figure 5:
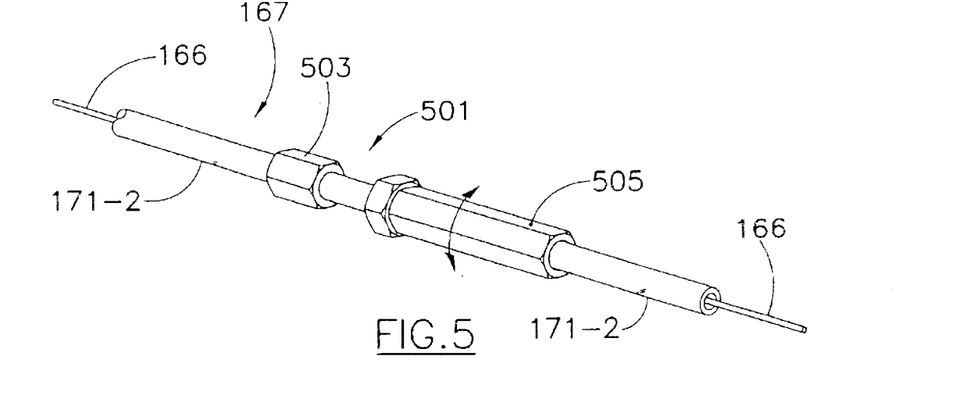
FIG. 5 shows the detail of a bowden cable-tensioning element of the conveyor of FIG. 1.

For a correct operation of the guide positioning system, the plays have to be substantially eliminated. The plays are eliminated by properly tensioning the bowden cables. To such end, according to an embodiment of the invention visible in FIG. 1 and, in magnified scale, in FIG. 5, each bowden cable 167 of the system of cables 137 includes a continuous cable core 166 inserted in two half-sheaths 171_1, 171_2 connected to each other through a tensioning element 501. The tensioning element 501 is, in the shown example, composed of a first bushing 503 mounted on the extremity of the half-sheath 171_1 and externally threaded, screw-joined to a second bushing 505 mounted on the extremity of the half-sheath 171_2 and internally threaded. Acting for example on the bushing 505 by screwing or unscrewing it, it is possible to properly tension the bowden cable 167. Other types of arrangements for tensioning the Bowden cables can clearly be envisaged.

The installation of the guide positioning system according the described embodiment of the present invention is a simple operation. Firstly, the active 131 and passive units 133 are fixed to the vertical rods of the brackets 129, at the desired height or heights. Then, the two guides 135 are fixed to the clamps 305 and 405. The different active and passive units are then connected to each other through the bowden cables. The cable cores 166 are inserted into the respective pairs of half-sheaths 171_1, 171_2, the free extremities of the half-sheaths 171_1, 171_2 are fixed to the shoulders 331a–d and 431a–d of the guide bodies 319, 419 and the extremities of the cable cores are connected to the wings 323a, 323b, 423a, 423b of the clamps 309, 409 or to the wings 327a, 327b, 427a, 427b of the plate-like elements 325, 425, having care to respect the connection criterion described above. This operation is rather simple, considering that each cable core must have an extremity connected to a unit 131 or 133 in correspondence of the side thereof facing the containment guide 135 and the opposite extremity connected to the adjacent unit 131 or 133 in correspondence of the side thereof opposed to the containment guide.

Figure 6:
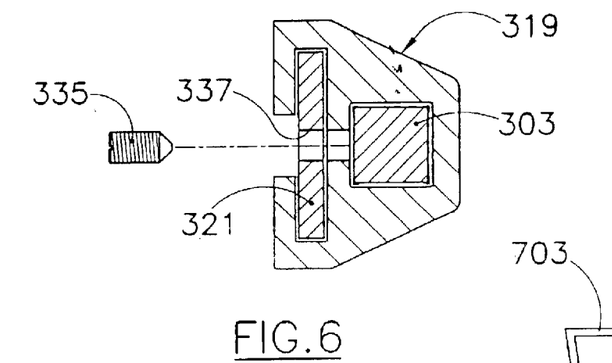
FIG. 6 is a view in transversal section of a part of the active unit of FIGS. 3A, 3B and 3C.

The plays are then eliminated. The shafts 303, 403 of the different units are preferably blocked in a position intermediate to the two limit-stop positions. This can for instance be obtained using forks that are mounted astride the shafts 303, 403 after having made the latter slide with respect to the guide bodies 319, 419 until they are brought in the desired position. Alternatively, as shown in FIGS. 3C and 4B, blocking of the shafts 303 and 403 can be achieved using grub-screws 335 and 435, screwable in threaded through holes 337 (FIG. 6) and 437 provided for in the intermediate portion 321 of the support bracket 313 and, respectively, in the leg 421 of the support bracket 413. The grub-screws 335 and 435 can in this way engage the shafts 303 and 403, blocking them.

The cylinder-piston assemblies 301 of the active units 131 can be of the type having two operating positions of the stem, or of the type having three or more operating positions described in the European patent application No. 01830487.3 in the name of the present Applicant. Other types of motor group can however be used, for instance hydraulic cylinder-piston assemblies, electric motors, such as stepper motors or linear motors.

Figure 9:
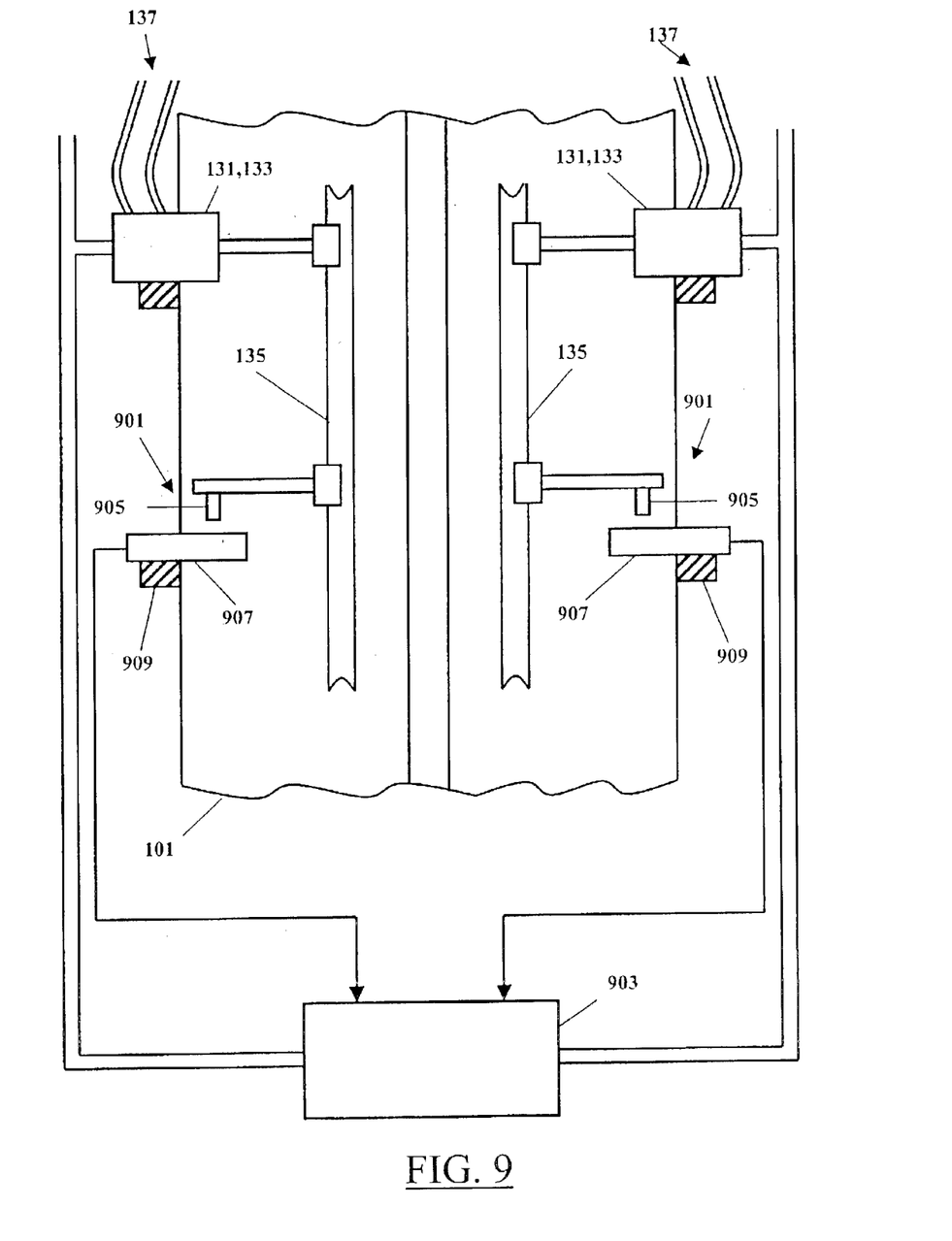
FIG. 9 is a schematic view from below of a section of the conveyor of FIG. 1, with guide position control elements according to an embodiment of the present invention.

All the active units 131 are preferably subjected to the control of a same command unit (schematically shown in FIG. 9 and identified by 903). For instance, in the case the motor groups are pneumatic cylinder-piston assemblies, the command unit, through a system of pipes, selectively feeds the cylinder-piston assemblies in the active units with fluid in pressure, for instance air.

Figure 7:
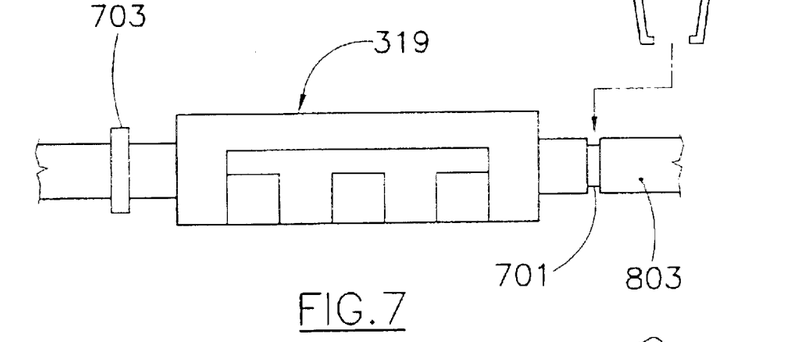
FIG. 7 is a top-plan view of a part of the active unit of FIGS. 3A, 3B and 3C, with associated limit stop means.
Figure 8:
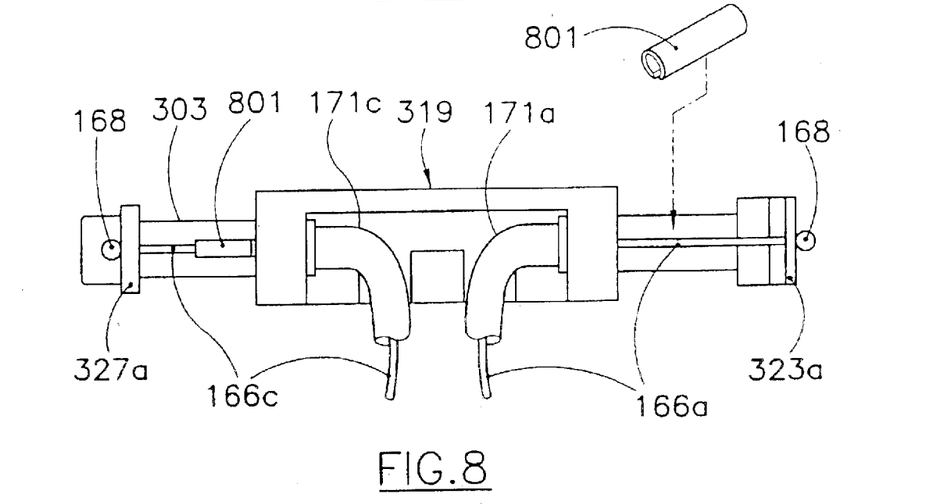
FIG. 8 is a top-plan view similar to that of FIG. 7, in which the active unit has associated therewith alternative limit stop means.

If desired, it is possible to make the extreme positions taken by the containment guides differ from those that would be determined by the motor group of the active unit. As shown by way of example in FIG. 7, this can for example be obtained simply mounting at least on the shafts 303 of the active units 131, in suitable grooves 701 provided thereon, one or two forks 703, upstream and downstream of the guide blocks 319. In this a way, the two limit stops of the shafts of the active units are determined by the position of the forks longitudinally to the shafts 303. Alternatively, as shown in FIG. 8, a similar result can be obtained mounting on the extremities of the cable cores of the bowden cables 131 joined to the active units spacers 801, in the example in form of cylinders, that limit the run of the shaft 303 acting as stop elements for the wings to which the extremities of the cable cores are hooked.

It is worth observing that any given guide positioning unit, be it active or passive, needs not necessarily be connected to units, active or passive, strictly adjacent thereto along the transport path. The connection scheme can in fact be of the most disparate, provided that the criterion is respected according to which a cable core that is connected at one end thereof to the proximal end of the shaft 303 or 403 of such unit must be connected, at the opposite end, to the distal end of the shaft 303 or 403 of the other unit.

As a further variation, along a same containment guide 135 more chains of active and passive guide positioning units can be provided, each chain having a separated system of traction-transmitting cables.

Additionally, a given active or passive unit can be also connected through traction-transmitting cables to more than two active or passive units. For example, instead of having the guide positioning units connected to each other in the cascade arrangement depicted in FIG. 1, an active unit, in particular the active unit at one extreme of the chain, may be connected to every other positioning unit of the chain in a point-to-point connection scheme.

As already mentioned, in the embodiment of FIG. 1 the two active or passive units located at the extremities of a chain of guide positioning units are connected only to the active or passive unit that follows or precedes them along the transport path and associated with the same containment guide. In this way, the position of each of the two containment guides 135 is adjustable autonomously: one containment guide can be moved while the other one is held steady, or the two guides can be moved of different amounts. If one accepts to renounce to the possibility of autonomously adjusting the position of the two containment guides, it is possible to connect one, for example the last, active or passive unit along the transport path associated with one of the two guides to one, for example the last, unit of the transport path associated with the other guide, with the same criterion adopted for the connection to each other of the different units associated with a same guide: the cable core that is put in traction by the advancement of the shaft 303 (in case of an active unit) or 403 (in case of a passive unit) has to be connected at the opposite end thereof to the plate-like element 352 (active unit) or 425 (passive unit), while the cable core that is put in traction by the withdrawal of the shaft has to be connected at the opposite end thereof to the clamp 309 (active unit) or 409 (passive unit). The first one of the guide positioning units associated with one of the two guides may additionally be connected to the first one of the guide positioning units associated with the other guide, according to the same criterion. In this way a double closed loop of bowden cables is formed.

It is observed that particular arrangements of active and passive guide positioning units can be devised in which the provision of two traction-transmitting cables between each pair of active or passive units is not strictly necessary. For example, in a closed-loop topology, it is sufficient to place just one traction-transmitting cable between each pair of adjacent, active or passive units. The traction force propagates through the loop in one sense (e.g., clockwise) for synchronously moving the two guides so as to, e.g., bring the two guides closer to each other, and in the opposite sense (e.g., counter-clockwise) for synchronously moving the two guides so as to, e.g., increasing the distance therebetween. In particular, the sense along which the traction force is propagated through the loop for, e.g., putting the two guides closer to each other depends on the how the ends of the cores of the bowden cables are connected to the guide positioning units. As another example, if two active units are provided in correspondence of the two ends of each chain of guide positioning units, a single bowden cable is sufficient to transmit to all the intermediate guide positioning units, active or passive, traction forces adapted to cause the synchronous movement of the guide in the two opposite senses. More generally, whenever one or more passive units are interposed between two active units (such as, for example, the two passive units 133 arranged between the first and the second active units 131 starting from the right side of FIG. 1), a single bowden cable is sufficient to transmit to all the intermediate units traction forces adapted to cause the movement of the guide, synchronously for each section thereof, in the two opposite senses. As another example of configuration requiring a single bowden cable, the active or passive units associated with any one of the two guides may be connected by a closed-loop system of bowden cables, the two guide positioning units located at the extremities of a respective chain of guide positioning units being connected to each other by a bowden cable.

Several active and passive units can also be positioned at different heights from each other along the vertical rods of the support brackets.

In principle, a single active unit can be sufficient to drive all the passive units associated with a same containment guide or, in the case of closed-loop traction-transmitting cable topologies, with both the containment guides. The active unit behaves as a traction unit, exerting traction forces on the system of traction-transmitting cables for inducing the movement of the guides. The system of traction-transmitting cables may comprise one or two traction-transmitting cables between each each pair of positioning units, depending on the topology being open-loop or closed-loop. Nevertheless, in order to limit the stresses both on the active units and on the cable cores of the bowden cables, it is preferable to provide more than one active units, intercalated to the passive units; each active unit may be viewed as a traction unit. For instance, in the embodiment shown in FIG. 1, every two passive units 133 an active unit 131 is provided for. It is in fact observed that after a bowden cable has been tensioned, in order to make the cable core slide within the respective sheath a friction force must be overcome; such a friction force arises for example from the fact that the cable core, once tensioned, adheres to the inner wall of the respective sheath. If the traction force exerted on one end of the cable core is not sufficient to overcome the friction force, the cable core does not slide within the respective sheath, and the movement is not propagated. The number of active units to be distributed along the transport path, and the power of the respective motor groups shall be determined on the basis of the overall friction force acting on the bowden cable cores, and on the strength thereof. It is observed that the traction unit or units need not necessarily be operatively coupled to the guide elements to be moved (i.e., the shafts of the traction unit or units need not necessarily be coupled to the guide element).

It is also observed that nothing prevents from using all active units; in this case, the provision of the traction-transmitting cables (one or two between each pair of units) allows synchronising the movement of the different active units. It is thus ensured that all the guide positioning units impart a substantially identical movement to the respective clamps, and thus the guides are equally moved along every section thereof.

The Applicant has also found that the friction force acting on the Bowden cable cores can be expediently exploited to avoid the necessity of providing mechanical stop elements and of keeping the motor groups of the active units powered in order to keep the guides in a desired position. As mentioned previously, if the bowden cables are properly tensioned (an operation already required for eliminating undesired plays), in order to make the cable cores slide within the respective sheaths a traction force must be applied to the cables cores higher than the friction force acting on the cable cores. In view of this, when the motor groups of the active units are not powered, the guides remain in the position they currently are. By controlling the powering of the motor groups (e.g., controlling the feed of air in pressure to the pneumatic cylinder-piston groups, or the current supplied to the electric motors) it is possible to move the guides to a desired position; once the desired position is reached, the powering of the motor groups can interrupted, and the guides remain in that position.

FIG. 9 schematically shows from below a section of the conveyor of FIG. 1 equipped with a guide positioning system according to an embodiment of the present invention, in which guide position detectors 901, such as mechanically-actuated switches, proximity sensors, or encoders, are used to provide an indication of the guide position; the guide position indication provided by the guide position detectors 901 is exploited by the command unit 903 controlling the powering of the motor groups of the active units 131; when the desired guide position is reached, the command unit 903 may interrupt the powering of the motor groups (for example, closing an electrovalve). For example, the guide position detectors may comprise a movable element 905, movable together with a respective one of the guides 135, for example mounted on the guide, and a fixed element 907, steady with respect to the guide, for example mounted on a bracket 909 similar to the brackets 129. In particular, the use of an encoder allows having a continuous range of admissible positions for the guides.

Thanks to the present invention, the positioning of the side containment guides of the conveyor is not entrusted to a manual intervention and it is, consequently, fast, easy and precise.

The positioning system according to the present invention has a reasonable cost, since a limited number of active units may be sufficient. Particularly, the cost of the positioning system according to the present invention can be kept substantially lower with respect to that of the positioning system cited in the introduction of the present description, comprising at least one pneumatic cylinder-piston assembly for each support clamp of the containment guides.

The provision of the system of traction-transmitting cables ensures synchronicity between the different positioning units, be they active or passive.

The positioning system according to the present invention is also less critic from the viewpoint of problems of misalignment of the different shafts of the active and passive units, deriving from manufacturing tolerances and from inaccuracies in the assemblage of the several parts composing it. In particularly, possible misalignments do not cause blocking of the motor groups of the active units.

If in the conveyor it is necessary to provide more pairs of containment guides 135, placed at different heights, it suffices to provide on each vertical rod 130, at different heights, as many active or passive units as the pairs of containment guides. If the position of the different pairs of containment guides needs to be autonomously adjustable, the active and passive units associated with a pair of containment guides will not be connected through bowden cables to the active or passive units associated with the other pairs of containment guides. If instead the position of the different pairs of containment guides can be adjusted simultaneously, the active or passive units associated with a pair of containment guides are connected through bowden cables to the active and passive units associated with the other pairs of containment guides. For example, let it be assumed that two pairs of containment guides are provided, placed at different heights with respect to the box-shaped casing 101. On each vertical rod 130 two active units or two passive units, or also an active unit and a passive unit can be mounted, at different heights. One of such units can transmit the motion, through bowden cables, to the other unit placed at a different height, which will then transmit the motion to an adjacent unit along the transport path.

Although described with reference to the positioning of the containment guides of a pneumatic conveyor of plastic bottles, the present invention can also be applied to the positioning of the support guides 117 and can find in general application within the positioning of guide elements in conveyors of any typology, for instance belt or chain conveyors.

The present invention has been here described in terms of some possible embodiments thereof. It is clear that the persons skilled in the art can bring several changes to the embodiments described, as well as conceive other embodiments of the present invention, without for this departing from the spirit of the invention defined in the appended claims.

For example, different types of coupling of the Bowden cables to the active/passive units and different arrangements for converting the traction forces transmitted by the Bowden cables into a translation movement of the clamps can be envisaged.

What is claimed is:

1. A positioning system for a guide elements of a conveyor, comprising:
   at least one driving unit operatively coupled with the guide element and comprising a motor group and a first guide positioning element;
   at least one driven unit operatively coupled with the guide element and comprising a second guide positioning element;
   a first traction-transmitting system coupling the at least one driving unit to the at least one driven unit;
   the at least one driving unit, by means of the motor group, being adapted to provide a first and a second translational movement of the first guide positioning element in order to cause this first guide positioning element to move in a first direction and in a second direction, respectively, the first direction being opposite to the second direction; and
   the at least one driving unit, by means of the motor group, further being adapted to exert a first and a second traction force on the first traction-transmitting system in order to cause the second guide positioning element to move in said first direction and in said second direction, respectively.

2. The guide positioning system of claim 1 comprising at least two driven units, a first driven unit being coupled to the driving unit through the first traction-transmitting system, and a second driven unit being coupled to the driving unit through a second traction-transmitting system.

3. The guide positioning system of claim 1 comprising at least two driven units, a first driven unit being coupled to the driving unit through the first traction-transmitting system and a second driven units being coupled to the first driven unit through a third traction-transmitting system.

4. The guide positioning system of claim 1 comprising at least two driving units, a first driving unit being coupled to a second driving unit through a fourth traction-transmitting system.

5. The guide positioning system of claim 1 wherein the first traction-transmitting system comprises one traction-transmitting cable.

6. The guide positioning system of to claim 1 wherein the first traction-transmitting system comprises two traction-transmitting cables.

7. The guide positioning system of claim 3, wherein a series of at least two driven units is positioned between the first driving unit and a second driving unit, the first driving unit being coupled to a first driven unit in in the series and the second driving unit being coupled to a last driven unit in the series.

8. The guide positioning system of claim 1 in which both the first and second guide positioning elements comprises a sliding member adapted to be coupled to the respective guide element.

9. The guide positioning system of claim 8 in which the first traction-transmitting system comprises at least one traction-transmitting cable and in which the sliding member of the second guide positioning element is operatively coupled to respective extremities of the at least one traction-transmitting cable, and is caused to slide by the action of the first or of the second traction forces.

10. The guide positioning system of claim 8 in which the first traction-transmitting system comprises at least one traction-transmitting cable and in which the sliding member of the first guide positioning element is operatively coupled to an extremity of the at least one traction-transmitting cable, and is caused to slide by a combined action of the motor group and the traction forces transmitted by the at least one traction-transmitting cable.

11. The guide positioning system of claim 1 in which the motor group comprises one among a cylinder-piston assembly operated by a fluid in pressure and an electric motor.

12. The guide positioning system of claim 1 further comprising a guide element position detector adapted to be operatively associated to the guide elements, and a command unit controlling the at least one driving unit, the guide element position detector providing an indication of a position of the guide elements to said command unit.

13. The guide positioning system of claim 1 in which the first traction-transmitting system includes bowden cables.

14. A conveyor of articles comprising at least one guide element for guiding the articles along a transport path, and a positioning system of the at least one guide element for positioning said guide element according to the specific form of the transported articles, wherein the guide positioning system comprises: at least one driving unit operatively coupled with the guide element and, comprising a motor group and a first guide positioning element;

at least one driven unit operatively coupled with the guide element and comprising a second guide positioning element;

a first traction-transmitting system coupling the at least one driving unit to the at least one driven unit;

the at least one driving unit, by means of the motor group, being adapted to provide a first and a second translational movement of the first guide positioning element in order to cause this first guide positioning element to move in a first direction and in a second direction, respectively, the first direction being opposite to the second direction;

the at least one driving unit, by means of the motor group, being adapted to exert a first and a second traction force on the first traction-transmitting system in order to cause the second guide positioning element to move in said first direction and in said second direction, respectively.

15. The guide positioning system of claim 2 wherein both the first and the second traction-transmitting systems comprise one traction-transmitting cable.

16. The guide positioning system of claim 3 wherein the first and third traction-transmitting systems each comprise one traction-transmitting cable.

17. The guide positioning system of claim 4 wherein the fourth traction-transmitting system comprises one traction-transmitting cable.

18. The guide positioning system of claim 2 wherein the first and the second traction-transmitting systems each comprise two traction-transmitting cables.

19. The guide positioning system of claim 3 wherein the first and third traction-transmitting systems each comprise two traction-transmitting cables.

20. The guide positioning system of claim 4 wherein the fourth traction-transmitting system comprises two traction-transmitting cables.

21. The guide positioning system of claim 16 wherein a series of at least two driven units is positioned between the first driving unit and a second driving unit, the first driving unit being coupled to a first driven unit in the series and the second driving unit being coupled to a last driven unit in the series.

22. The guide positioning system of claim 19 wherein a series of at least two driven units is positioned between the first driving unit and a second driving unit, the first driving unit being coupled to a first driven unit in the series and the second driving unit being coupled to a last driven unit in the series.

* * * * *